(12) United States Patent
Pilo'

(10) Patent No.: US 8,412,625 B2
(45) Date of Patent: Apr. 2, 2013

(54) SYSTEM AND METHODS FOR A MULTI-CHANNEL PAYMENT PLATFORM

(75) Inventor: Bruno Pilo', Grugliasco (IT)

(73) Assignee: Bruno Pilo' & Associates, LLC, Greenwood Village, CO (US)

( * ) Notice: Subject to any disclaimer, the term of this patent is extended or adjusted under 35 U.S.C. 154(b) by 382 days.

(21) Appl. No.: 12/229,547

(22) Filed: Aug. 25, 2008

(65) Prior Publication Data
US 2010/0049654 A1    Feb. 25, 2010

(51) Int. Cl.
*G06Q 40/00*    (2006.01)
(52) U.S. Cl. .......................................... 705/39; 705/40
(58) Field of Classification Search ............... 705/10–44
See application file for complete search history.

(56) References Cited

U.S. PATENT DOCUMENTS

| | | | | |
|---|---|---|---|---|
| 5,732,400 | A * | 3/1998 | Mandler et al. | 705/26.44 |
| 6,092,053 | A * | 7/2000 | Boesch et al. | 705/26 |
| 6,587,835 | B1 * | 7/2003 | Treyz et al. | 705/14 |
| 6,598,027 | B1 * | 7/2003 | Breen et al. | 705/26 |
| 6,985,608 | B2 * | 1/2006 | Hoffman et al. | 382/115 |
| 7,013,290 | B2 * | 3/2006 | Ananian | 705/27 |
| 7,035,820 | B2 * | 4/2006 | Goodwin et al. | 705/37 |
| 7,062,454 | B1 * | 6/2006 | Giannini et al. | 705/27 |
| 7,167,844 | B1 * | 1/2007 | Leong et al. | 705/80 |
| 7,167,884 | B2 * | 1/2007 | Picciolo et al. | 708/322 |
| 7,177,836 | B1 * | 2/2007 | German et al. | 705/40 |
| 7,191,151 | B1 * | 3/2007 | Nosek | 705/39 |
| 7,249,055 | B1 * | 7/2007 | Elder | 705/26 |
| 7,263,505 | B1 * | 8/2007 | Forlai | 705/37 |
| 7,299,200 | B2 * | 11/2007 | Manstein et al. | 705/26 |
| 7,356,508 | B2 * | 4/2008 | Pellegrini | 705/41 |
| 7,540,408 | B2 * | 6/2009 | Levine et al. | 235/379 |
| 7,921,038 | B2 * | 4/2011 | Matsuda et al. | 705/17 |
| 7,983,993 | B2 * | 7/2011 | Graves et al. | 705/67 |
| 8,126,778 | B2 * | 2/2012 | Boyd et al. | 705/26.1 |
| 8,214,238 | B1 * | 7/2012 | Fairfield et al. | 705/7.11 |
| 8,306,881 | B2 * | 11/2012 | Von Drehnen et al. | 705/31 |

* cited by examiner

*Primary Examiner* — Frantzy Poinvil
(74) *Attorney, Agent, or Firm* — R. Ruschena Patent Agent, LLC

(57) ABSTRACT

The platform executes secure payment transactions between customers and registered merchants by using remote terminals. When the user authorizes his/her payment data (e.g. using a credit card) to be permanently stored in the central system, it is possible to extend payment functionality to other remote devices (e.g. a mobile phone, a cable-TV, a touch-tone telephone . . . etc). By remotely placing the payment functionality on the central system, payment data are never managed by the merchant or by the user. The system comprises a central computer information system and a number of remote terminals used for executing payment requests. When receiving a payment request, the platform recognizes the user, retrieves from its database his method of payment, the merchant account number and conducts the real payment transaction interacting with external financial institutions.

16 Claims, 8 Drawing Sheets

SYSTEM AND METHODS FOR A MULTI-CHANNEL PAYMENT PLATFORM

BACKGROUND OF THE INVENTION

1. Field of the Invention

This invention relates to the field of Information and Communications providing a novel system and methods for a secure, multi-channel, multi-merchant, multi-card payment platform, which includes a novel remote public terminal available to the purchasing party.

The purpose of this invention is to provide a system and methods for the use of a telecommunication platform enabling payment transactions between enrolled merchants and registered or unregistered users, using a remote public terminal or other enabled channel-devices. Payment transactions are processed as real time, direct bank payments which are carried through one or more financial institutions and are not intended to be a virtual exchange of monetary values between the interested parties.

Nowadays, a merchant that wants to sell merchandise to its customers needs to acquire the customer's payment information regardless if the sale is carried out via the web, in a shop or using a telephone order. Furthermore, the merchant must have a complete billing and payments information system in order to process and manage the customer's data and interact properly with all involved financial institutions such as banks, credit card companies, . . . etc. This implies managing a payment information system and a telecommunications connection for each method of payment that also needs to be integrated with the accounting system and consolidated at corporate level.

This causes useless multiplication of identical information, systems and processes for all merchants, generating security issues, a limitation of selling channels, a limited number of payment methods, using, for example, a credit card either directly managed or interfaced with a dedicated payment system such as "PayPal", "Cyber Cash", . . . etc.

Previous attempts to allow payment methods using electronic devices have generated a number of solutions that are not widely used because of their proprietary implementation features that are working only for a limited number of users.

Other solutions to allow payments using other electronic devices, like, for example, using a Pay TV requiring credit card data supplied using the remote control, have failed because of security issues and the inability to verify the credit card validity in real-time. The same issue arises on any electronic device not specifically designed to carry out a secured payment transaction.

The solution to these current problems is achieved by this invention by remotely placing the payment function on a dedicated payment device, capable of validating the payment instrument and performing real time payment transactions.

The novel remote payment device available to the purchasing party is used like a remote control which instructs the payment server to execute the desired payment transaction without the need of entering any sensible data related to the chosen method of payment. This invention, while resolving all security issues related to the disclosure to the merchants of payment data, allows the use of not only any type of credit card, but also any other electronic payment methods such as a debit cards, pre-paid cards, and revolving cards. This invention comprises a system that overcomes the mentioned limitations, and, at the same time, extends the payment capability to a larger number of users by allowing them to execute payments using electronic devices that were not available before. This invention doesn't require any electronic device modification, either new hardware or software, or user training, allowing an immediate utilization of the platform by everybody.

The term "Multi-channel" means the possibility of receiving payment orders from a variety of remote electronic devices, such as, dedicated public remote terminals, smart phones, touch-tone telephones, interactive digital televisions, biometric readers, . . . etc.

The term "Multi-merchant" means that the payment platform is an open architecture hosting an unlimited number of merchants, and it is not limited to one single marketplace, like the World Wide Web, but it is a payment infrastructure enabling electronic payments for multiple marketplaces.

In information technology, the term "Platform" describes a hardware architecture and a software framework, including application frameworks allowing the software to be executed. Typical platforms include a computer's architecture, an operating system, programming languages and related runtime libraries or graphical user interfaces.

The term "Multi-card" means that the platform has no limitation in accepting payment cards of any kind, including credit cards, debit cards, revolving cards, prepaid cards etc whereas in other environments (e.g. websites) accepted payment cards are limited to credit cards or some other mechanism which still requires entering sensitive information.

The term "secure" means that payment sensitive data are never exchanged in the payment process to avoid "phishing" and card "cloning". Card cloning is the creation of an identical copy of a payment card after card data have been illegally acquired. In computing, "phishing" is an attempt to fraudulently lure users to enter at a website sensitive and personal information, such as credit card data, social security numbers or bank account numbers by disguising the requests of such sensitive information as trustworthy, legitimate requests, when in fact the purpose of capturing those information is for illegal use.

2. Brief Description of the Prior Art

Numerous patents have been granted to automated, computerized payment methods. U.S. Pat. No. 7,089,208 "System and method for electronically exchanging value among distributed users" by Levchin et al, assigned to the popular PayPal, Inc., is an example of a method to pay online purchases using a computerized system allowing payments using web-enabled devices. However, the similarity of the payment method disclosed by this invention is limited to the presence of registered users and to the capability they have to complete the payment order using a remote terminal. A further reading of the patent reveals the core functioning of the "PayPal" system, although still being "online", it is not in "real time". The PayPal system provides the association of an electronic account to each registered user, without any distinction between the buyer or the seller. Whoever is registered to the system is allowed to pay or being paid via an electronic account, which is fed by the user using a credit card. The sale transactions and the relative debit/credit transactions are managed using electronic accounts, by moving the transaction amounts between accounts. In case of an insufficient fund situation on a buyer account, PayPal is authorized to debit the buyer's credit card to balance the account. PayPal is then actually acting as a financial institution, able to issue electronic currency. By subscribing to the service, the user accepts to purchase and redeem from PayPal the electronic currency needed to carry out or receive payments to/from other users. By executing the financial transaction, PayPal attempts to convert the electronic currency into "real" currency within five working days from the transaction.

From the financial point of view, PayPal is then the only one "merchant", being PayPal the manager of the currency accounts and to credit, when requested, the balance to "real" bank accounts using banking wire transfers. The PayPal user can request the reimbursement of the entire or partial balance of the electronic account by supplying bank account information. The reimbursement is also subject to fees and it can take five working days or more, depending on various circumstances, without the assurance about the actual time needed to complete the processing of the transaction, as the system is not conceived to operate in "real time". From a technical point of view, the use of PayPal requires "clients" terminals on which the dedicated software is installed, which allows the connectivity with various PayPal servers to execute payments.

A PayPal user needs to have a personal computer and needs to be sufficiently capable to install and use the client software and enter the appropriate commands . . . etc. The PayPal client software allows the monitoring of the user's electronic account, and executed transactions. The PayPal system is then strongly connected to its "front-end" system which needs to be used by every user.

In conclusion, the PayPal system is a proprietary payment system based on issuing electronic currency and on the exchange of monetary amounts between the accounts of the participating users. The other participants (buyers and sellers) are users that feed the virtual accounts, make the debit/credit exchanges with other users and periodically can request a real currency refund with related wire transfer transaction to their real bank accounts.

This inventive system, instead, is an open payment system, multi-users, integrated system using the standards of the POS (Point of Sale) transactions, and operating in real time using the inter-banking network. This method does not generate: debit/credit accounting situations, nor a need for balancing, nor a need for feeding accounts, nor requests for reimbursements.

In the platform disclosed by the present invention, there are no user's accounts, either for buyers or for sellers. The payment transactions (debit/credit) are not carried out in electronic currency and do not cause the transfer between accounts, but generate real time POS (Point Of Sale) transactions on the real inter-banking network. This does not create situations of balance reimbursements or the need for "feeding" electronic accounts. In the present invention, debit and credit transactions are executed in real time, affecting directly the parties involved. The system is actually a multi-users gateway payment system and does not present use limitations either regarding the transaction amounts or debit/credit transaction time. From a technical point of view, the system of the present invention accepts payment requests in a standard form from many "channel devices". These channel devices are not parts of the system, being "Front End" systems managed directly by the merchants (e.g. a system gathering orders using digital TV).

Since the actual execution of the credit/debit transactions are standard POS transactions, written statements regarding the confirmation of the transactions are automatically included on the account statements generated by external financial institutions. Therefore, it is not necessary for a user of the new system to monitor the accounting situation. The system according to the invention is a gateway payment system, multi-merchant, independent from all communication channels, and therefore not limited to the on-line environment. The system processes payment transaction POS in real time and it is totally different from trading electronic currency. The payment amounts are directly credited to the merchant accounts in real time, without the intervention of intermediate financial institutions. The system is free from limitations due to outstanding balances between users.

U.S. Pat. No. 5,329,589 "Mediation of Transactions by a Communication System" of Fraser et al., assigned to AT&T, teaches a system that is different in both the concept and in the method of use, when compared to this invention. First of all, being the patent granted in 1994, it describes a telephone technology based on central switchboards and "pulse" telephones. The disclosed novelty is in fact a mediation system between a buyer and a seller using an electronic communication system between the two parties. The scope of the system is to connect the two parties, collect the information from the buyer, collect the information from the seller, store them and execute a transaction, and communicate the outcome to the buyer and the seller. In this way, this mediation system can hide from each party the sensitive in formation of the other party.

When compared to this invention, it is evident that the present invention uses a remote gateway system, that when it receives a payment request which actually contains only the amount, it is able to retrieve from the database, all other needed data related to the seller and to the buyer and it is not functioning as a mediator between the two parties. According to the Fraser's patent, the payment data are instead entered into the system at the purchasing time and the purchase amount is supplied to the system by the seller. The transaction is completed when there is an "agreement" between the two parties, agreement reached electronically by the mediation system (see U.S. Pat. No. 5,329,589 description in col. 80 line 30, col. 8, line 40 and col. 8 line 55; and the descriptions of column 12, line 40, col. 12, line 45 and col. 12 line 60. After gathering all required data, the system, as described by Fraser, executes the payment transaction and communicates to both parties the transaction's outcome, according to the mediator's functionality.

According to the present invention, the payment data are never supplied to the system during the "purchasing" phase, and the transaction data are supplied to the system by the seller, and not from the buyer, after the seller has received the payment request from a buyer via a "channel device" such as a remote public terminal, interactive TV, cellular phone, land-line telephone . . . etc. Still according to the present invention, there is no need of electronically gathering the purchase agreement between the two parties, before the payment transaction is carried out, as it is required, instead, by the system illustrated by Fraser et al. and by the Levchin et al. patent. Clearly, according to the present invention, the system does not behave as a mediator, but simply as a "payment gateway", remotely instructed using different type of terminals on which the payment data are never entered.

A payment gateway, as known to the experts in the field, is an e-commerce application service provider that authorizes payments for e-businesses, online retailers, "bricks and clicks", or traditional "brick and mortar". It is the equivalent of a physical point of sale terminal located in most retail outlets. Payment gateways encrypt sensitive information, such as credit card numbers, to ensure that information passes securely between involved parties.

The similarities between the system of the present invention and the systems described by Fraser et al. and by Levchin et al. (assigned to PayPal), are limited to the fact that the seller does not know the buyer's payment data and that there is obviously the presence of an electronic communication system, but both the process and the architecture implementation are completely different. In the system of the present invention, a central database is storing the buyers' and sellers' payment data, previously authorized to be loaded on the platform, thus avoiding the need from the part of the buyer to disclose a second time his/her payment data.

Before describing in details the present invention, it is necessary to supply general information regarding the current state-of-the-art of various payment devices used by electronic payment systems.

Today, there is a clear separation between dedicated "payment devices" such as EFTPOS (Electronic Funds Transfer Point of Sale), and "web devices" such as personal computers, PDAs . . . , etc. EFTPOS is extremely popular in the United States, the United Kingdom, Germany, Australia, New Zealand, and Canada. EFTPOS refers to the technology that allows a merchant retailer to directly debit a customer's bank account by using a debit or a credit card. The payment card, generally, is the same as an ATM debit card swiped through a reading device. Using EFTPOS, the money is wired directly to the merchant retailer's bank account, thus eliminating the liability of accepting actual cash, but EFTPOS is a solution that can only be used to make a payment transaction for a specific merchant retailer, in a specific shop location, where the EFTPOS is located. Current e-commerce implementations can be found on the web, where a number of different solutions have been put in place to get the customer's method of payment. Some solutions go through an interactive process by which the buyer, each time makes a purchase, has to manually insert payment data (e.g. credit card number) and other related info such as name, shipping address, and other personal information. This means releasing buyer's sensitive data, which in many cases, create important security and privacy issues, as known.

Because of their limited features, EFTPOS, PayPal and other current payment solutions show great limitations and are not applicable for payments in other marketplaces such as TV shopping, telephone orders, and mobile payments.

TV shopping today is mainly represented by advertising products on a broadcasted TV channel, usually accompanied by a presenter explaining the sale item's features, price and available discounts. When a person desires to buy an item, he/she needs to call directly the advertising company, usually by calling a toll-free number and ordering to an operator. The buyer is then asked to provide by telephone, a credit card number along with other information such as name, address, card expiration date and so on, or to choose otherwise another method of payment (e.g. cash on delivery). This process needs to be repeated every time the same buyer wants to buy something advertised on TV.

Interactive television is a major breakthrough and will become more and more a trusted tool available to millions of television viewers. We can only refer to "interactive television" as long as there is a communication "return path" from the TV to the broadcaster. This "return path" or "back channel" can be represented by telephone lines, mobile SMS (text messages), radio, and digital subscriber lines (ADSL), or cable. Cable TV viewers receive their programs via a cable, and, in the integrated cable return path enabled platforms, they use the same cable as a return path. For satellite TV viewers, return information to the broadcaster are sent via their regular telephone lines. An Internet connection via ADSL, or other data communications technology, is also being increasingly used. Some devices are now dedicated to display video only from the IP channel, which has given birth to IPTV (Internet Protocol Television). The birth of the "broadband return path" has given new interest to Interactive TV, because it provides interactivity with Video-on-Demand servers, advertisers, web site operators and potentially with a payment gateway. To allow payments using the TV set, the only solution is to join the ITV capabilities with those of an external multi-channel payment platform. Furthermore, this new payment platform gives the TV broadcaster the opportunity to implement and run a full-functioning "interactive marketplace" not limited to its own services, but also capable of selling goods and services of other companies. The TV broadcaster then becomes a "broker" by which other companies can sell services to their customers similarly to what is today possible on the WEB. Everything is done within the platform, connected to the broadcaster application server and to the banking system. Therefore, the platform of the present invention allows for an interactive full TV-commerce marketplace offering to all companies the opportunity not only to advertise on TV, but also to directly selling goods and services on TV without worrying of how to get the payments.

Regarding payments using touch-tone telephones, the Dual-Tone Multi-Frequency (DTMF) is used for telephone signalling over the line in the voice-frequency band to the call switching center. The version of DTMF used for telephone touch-tone dialling is known by the trademarked term "Touch-Tone", and is standardized by ITU-T Recommendation Q.23. In the time preceding the development of DTMF, telephone systems employed a system commonly referred to as "pulse" (Dial Pulse or DP in the U.S.). Dual Tone Multi-Frequency or DTMF is a method for instructing a telephone switching system of the telephone number to be dialled, or to issue commands to switching systems or related telephony equipment. The engineers had envisioned telephones being used to access computers, because by using DTMF it is possible to operate a telephone via a computer interconnection. However, it is still impossible to use a touch-tone telephone to make a payment because complete payment data need to be entered using a keyboard, not a DMTF keypad.

The DTMF keypad is laid out in a 4×4 matrix, with each row representing a low frequency, and each column representing a high frequency. Pressing a single key (such as '1') will send a sinusoidal tone of the two frequencies (697 and 1,209 hertz). The multiple tones are the reason for calling the system multi-frequency. These tones are then decoded by the switching center to determine which key was pressed (numbers 0-9, #, *, A, B, C, D). Because of these limitations, touch-tone telephones cannot be used to complete a payment process which can require entering the customer name, or address, or any other relevant information. This invention offers the possibility of paying using a touch-tone telephone because payment data are not managed by the merchant anymore, but are stored in the platform's central database. In this way, the touch-tone telephone in the hands of the user becomes a "remote control" by which it is possible to call the system and authorize the platform to pay, from home or from any other enabled telephone line, by simply pressing the telephone keys.

The range of possible applications of this invention is quite extensive, like TV shopping (for those users not owning an interactive TV set), or other shopping opportunities by different advertising sources, like for example, newspapers, magazines, wall advertisement, . . . etc. Using the present invention, it is also possible to pay bills, make donations, buy tickets and any other kind of purchasing as long as it is known the merchant and the code of the item to be purchased.

Another possible application of this invention, are payments using mobile telephones. The mobile telephone, also called cellular phone, cell phone or handset, is a long-range, portable electronic device used for mobile communication that uses a network of specialized base stations known as cell sites. In addition to the standard voice function of a telephone, current mobile phones may support many additional services such as SMS for text messaging, email, packet switching to access the Internet, and MMS for sending and receiving photos and video. Consumer applications that include the largest categories of mobile services such as music, picture downloads, video gaming, adult entertainment, gambling, video/TV are on the rise. The cost of these services is usually billed by the telephone operator for mobile subscribers or it is deducted from the mobile telephone "traffic credits" for rechargeable accounts.

Wireless Application Protocol (WAP) is an open international standard for applications that use wireless communication. Its major application is to enable access to the Internet from a mobile phone or PDA. A WAP browser provides all of the basic services of a computer-based web browser but it is simplified to operate using the smaller view screen of a mobile phone. Mobile Web refers to the World Wide Web and it is accessed from mobile devices such as cellular phones, PDAs, and other portable devices connected to a public network. Mobile web access today still suffers from interoperability and usability problems. This is partly due to the small physical size of the screens of mobile devices and partly due to the incompatibility of many mobile devices with not only computer operating systems, but also with the format of the WEB pages as normally displayed using the Internet. It is a fact that today's mobile phones still lack the possibility of being used as general payment devices because of the absence of a standardized, easy-accessible payment platform. The "accessible payment platform" of the present invention provides the possibility to securely pay any kind of payment (e.g. a taxi fare, a parking ticket . . . etc.) using the mobile phone, without the need of entering payment data, without deducting the cost from the mobile phone "traffic credits", without bounds to any telecommunication operator and ideally working with any generation of cell phone as long as it is capable of simple text messaging (SMS) or has access to other communication layers such as the WAP (3G phones) or mobile WEB (Smart Phones). Third generation telephones (3G) is the third generation of mobile phone standards and technology, superseding 2G. It is based on the International Telecommunication Union (ITU) family of standards under the International Mobile Telecommunications programme, IMT-2000. Thus, to expand payment capability on new marketplaces and on new payment devices (Interactive TV, Touch-tone telephones, Mobile phones and others) what is needed is a system and methods that overcome today's limitations, allowing secure direct wiring payment transactions to the merchants, without the need of setting virtual money accounts.

SUMMARY OF THE INVENTION

The present invention provides a system and methods for processing secure payment transactions for a multi-service, multi-merchant, multi-channel environment.

According to the preferred embodiment, the platform may comprise one or more system servers and a number of remote terminals interconnected as a public or a private network. The network may be a wired or a wireless network, or a combination of both.

According to the current invention, payments can be executed using a remote public terminal. The remote public terminal is a device capable of displaying information related to services offered by enrolled merchants and to accept purchase orders from buyers, triggering on-line payment requests at the server side. The remote public terminal acts as a multi-merchant service provider and, when it is idle, it can be used as an advertiser media station able to show video clips and/or other advertisement messages. The remote public terminal can be located in any public, open space (gas stations, shopping malls, train and metro stations, hotels, fairs, . . . etc.) offering convenient opportunity for anyone to select and buy goods and services offered by multiple merchants. The remote public terminal can hold an unlimited number of payment applications, combining them into one single device, and combining with those of an EFTPOS online payment device. The remote public terminal features a user-friendly interface and needs to be equipped with an input device (e.g. touch screen, a virtual or physical keyboard, . . . etc.). The users selects what he/she wants to buy by following screen instructions and, when it is requested by the system, inserts his/her payment card into the terminal card reader, if the user is not yet registered into the system. The payment request at server side becomes a real payment transaction by debiting the buyer's actual bank account and crediting the involved merchant by directly wiring the sale amount to its bank account. After the first payment transaction is processed, the user is prompted for an optional, automatic registration phase, to be done only once, by which his or her payment data (e.g. credit card number) and other information, such as name and address, when applicable, is permanently stored and securely kept in the central database.

The registration phase requires the user to have a personal identification code which he/she may choose to be either automatically generated by the system or optionally retrieved by the terminal by reading the user's biometric data (e.g. fingertips). Since the registration is not mandatory, the unregistered user can repeatedly use any of the networked distributed remote terminals to buy services and goods by inserting his payment card in the card reader, using the terminal as a known multi-merchant EFTPOS station. Once registered, the user can use any of the worldwide remote public terminals just by activating it with his/her fingertip or by entering a personal code, depending on how the registration process was initially established. Registered users are then entitled to enter additional personal identification codes ("aliases") such as, for example, a home telephone number, an International Mobile Subscriber Identity code (IMSI) of a mobile phone, a cable TV smart card number, a car number plate . . . etc. either by operating on the remote public terminal, on the channel-device or by accessing a specific web page from any location. The user can "unregister" an identifier either completely (using the master identifier assigned to each user by the system) or a specific channel-identifier by operating on the remote terminal, with the interested channel-device or by accessing a specific web page on the internet.

Once the system is in place, it can be applied to unlimited payment situations, current and future, virtually using any type of payment device, as long as a device can be associated to a specific identifier and to one method of payment. The platform, according to the invention, allows to process full payment transactions in a multiplicity of situations today uncovered by any electronic payment systems, like for example TV shopping, mobile payments by cellular phone, . . . etc. This is always accomplished with an elevated level of security because in no case payment data need to be provided more than once by the user or are managed by any merchant, thus the platform executes fully secure payment transactions between customers and merchants. Merchants' enrolment is done by signing a contract with the entity running the platform (i.e. a Bank, a financial institution, a private company etc). By signing the contract, the merchant will communicate its bank account information in order to be credited and it will be assigned a specific merchant code to be used on the platform. The merchant code along with its bank account information are stored in the platform's central database. All payments done on the platform are directly showing on the user's bank statement of account (either as a single expense for a debit card or included in the monthly report if a credit card) and directly credited to the merchant so there is no need for "electronic money accounts" for both users and merchants. The involved merchants in no case manage or retrieve the customers' methods of payment. Merchants are only notified in terms of a "paid/not paid" response. Merchants' enrolment won't require them to have any telecommunication line with the credit card institution or with any other financial company and won't require them to obtain the customer's methods of payment.

DEFINITIONS

Figure 1:
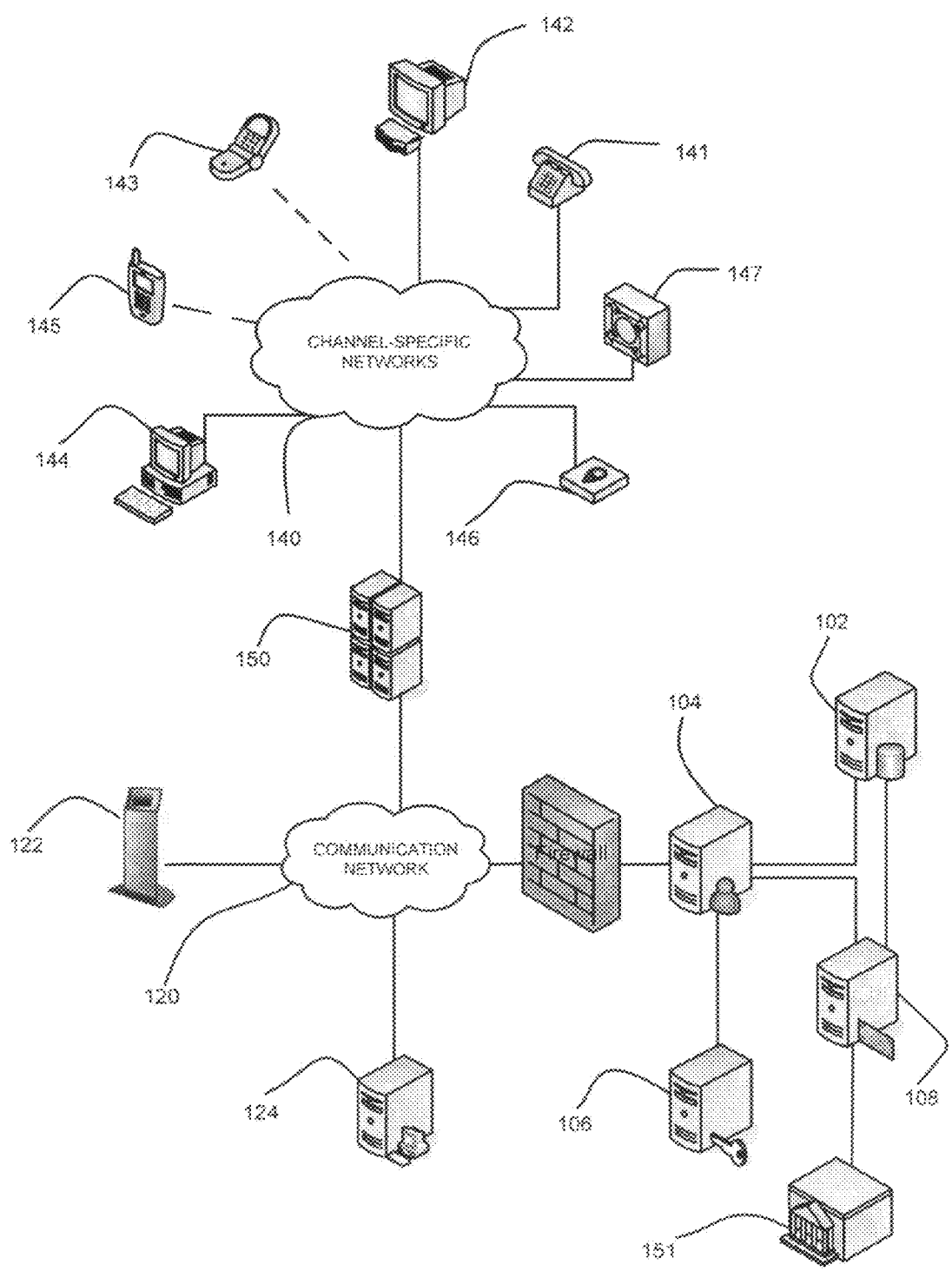
FIG. 1 is a network diagram depicting a system for a secure, multi-channel payment platform in accordance with one embodiment of the present invention.

Unique identifiers are a basic requirement to identify a user in this system.

By "telephone number" number is meant a sequence of numbers used to call from one telephone line to another in a telephone network. The number contains the information necessary to identify uniquely the intended endpoint for the telephone call. Each such endpoint must have a "unique number" within the PSTN public switched telephone network.

By "MAC address is meant a "unique identifier" attached to most network adapters (NICs). It is a number that acts like a name for a particular network adapter, so, for example, the network cards in two different computers will have different names.

By "IMEI" (International Mobile Equipment Identity) is meant a number "unique" to every GSM and UMTS mobile telephone. It is usually found printed on the phone underneath the battery and can also be found by dialing the sequence *#06# into the phone. The IMEI number is used by the GSM network to identify valid devices and therefore can be used to stop a stolen phone from accessing the network. For example, if a mobile phone is stolen, the owner can call his network provider and instruct them to "ban" the phone using its IMEI number. This renders the phone useless, regardless of whether the phone's SIM is changed. IMEI is used to "univocally identify" the device, and has no permanent or semi-permanent relation with the subscriber. Instead, the subscriber is identified by transmission of an IMSI number, which is stored on a SIM card which can be transferred to any handset. However, many network and security features are enabled by knowing the current device being used by a subscriber.

By "IMSI" (International Mobile Subscriber Identity) is meant a "unique number" associated with all GSM and Universal Mobile Telecommunications System (UMTS) network mobile phone users. It is stored in the Subscriber Identity Module (SIM) inside the phone and is sent by the phone to the network. It is also used to acquire other details of the mobile phone in the Home Location Register (HLR) or as locally copied in the Visitor Location Register. The IMSI is used in any mobile network that interconnects with other networks, in particular CDMA and EVDO networks as well as GSM nets. An IMSI is usually 15 digits long, but can be shorter, the first 3 digits being the Mobile Country Code, followed by the Mobile Network Code (MNC), either 2 digits (European standard) or 3 digits (North American standard). The remaining digits are the mobile subscriber identification number (MSIN) within the network's customer base.

By "smart card" is intended a chip card, or integrated circuit card (ICC) with embedded integrated circuits which can process information.

Smart card can provide strong authentication for single sign-on or enterprise single sign-on to computers, laptops, data with encryption etc.

Wherever a TV broadcaster has a working "return path" then it is entitled to receive payments having the user interacting with a pre-configured TV application. TV applications are usually activated by the person watching the TV by pressing special keys of the remote control. Many TV broadcasters already have in place this interaction which is mostly used to "purchase" an event, typically a "pay per view" movie. Using the same infrastructure which is already in place today, it will be possible for a user to use the remote control to buy goods and services from any merchant either by selecting them from a pre-configured list or simply by entering the item code as seen on a TV advertising. Smart cards are widely used to protect digital television streams and have each one a unique identifier.

By "public IP address" address (Internet Protocol address) is meant a "unique address" that certain electronic devices currently use in order to identify and communicate with each other on a computer network utilizing the Internet Protocol standard (IP)—in simpler terms, a computer address. Any participating network device including routers, switches, computers, infrastructure servers, printers, Internet fax machines, and some telephones can have its own address that is unique within the scope of the specific network. The IP address acts as a locator for one IP device to find another and interact with it.

By "biometric image" is meant a biometric system networked with telecommunications technology becoming a tele-biometric system. The main operations a tele-biometric system can perform are enrollments and tests. During the enrollment, biometric information from an individual is stored. During the test, biometric information is detected and compared with the stored information. The sensor is the interface between the real world and the system acquiring all necessary data. It then performs all the necessary pre-processing: it removes artifacts from the sensor, enhances the input (e.g. removing background noise), uses some kind of normalization, etc. Third, features needed are extracted. A vector of numbers or an image with particular properties is used to create a template. A template is a synthesis of all the characteristics extracted from the source, in the optimal size to allow for adequate "unique identifiably".

By "voice recognition" is meant a voice frequency (VF) or voice band is one of the frequencies, within part of the audio range that is used for the transmission of speech. In telephony, the usable voice frequency band ranges from approximately 300 Hz to 3400 Hz. The sound of each individual's voice is "entirely unique" not only because of the actual shape and size of individual's vocal cords but also due to the size and shape of the rest of that person's body. Speaker recognition (also known as voice recognition) is the computing task of recognizing people. Such systems extract features from speech, model them, and use them to recognize the person from his voice. By speaker recognition is intended recognizing who is speaking. Speaker recognition uses the acoustic features of speech that have been found to differ between individuals known using models known as "voice templates" or "voiceprints".

DETAILED DESCRIPTION OF THE PREFERRED EMBODIMENTS

The purpose of this invention is to provide a system and methods for the setting and use of a telecommunication platform enabling payment transactions between enrolled merchants and registered or unregistered users, using a remote public terminal or other enabled channel-devices currently available. Payment transactions are intended to be real, direct bank payments which are carried in real time through one or more financial institutions and are not intended to be a virtual exchange of monetary values between the interested parties. The payment process is always performed in the same way regardless of the method used to buy. In order to accomplish that, the process is spilt into two components, called the "Gear Box" and the "Kernel".

FIG. 1 illustrates a system for a secure payment platform according to one embodiment of this invention. Alternative embodiments of the invention may include any subset or combination of the components of the illustrated system. The system includes a central database 102 configured to store various information needed to register users, merchants and networked terminals 122. Illustratively, the information stored in database 102 includes user's method of payment in association with their identifiers and the merchant accounts.

Figure 4:
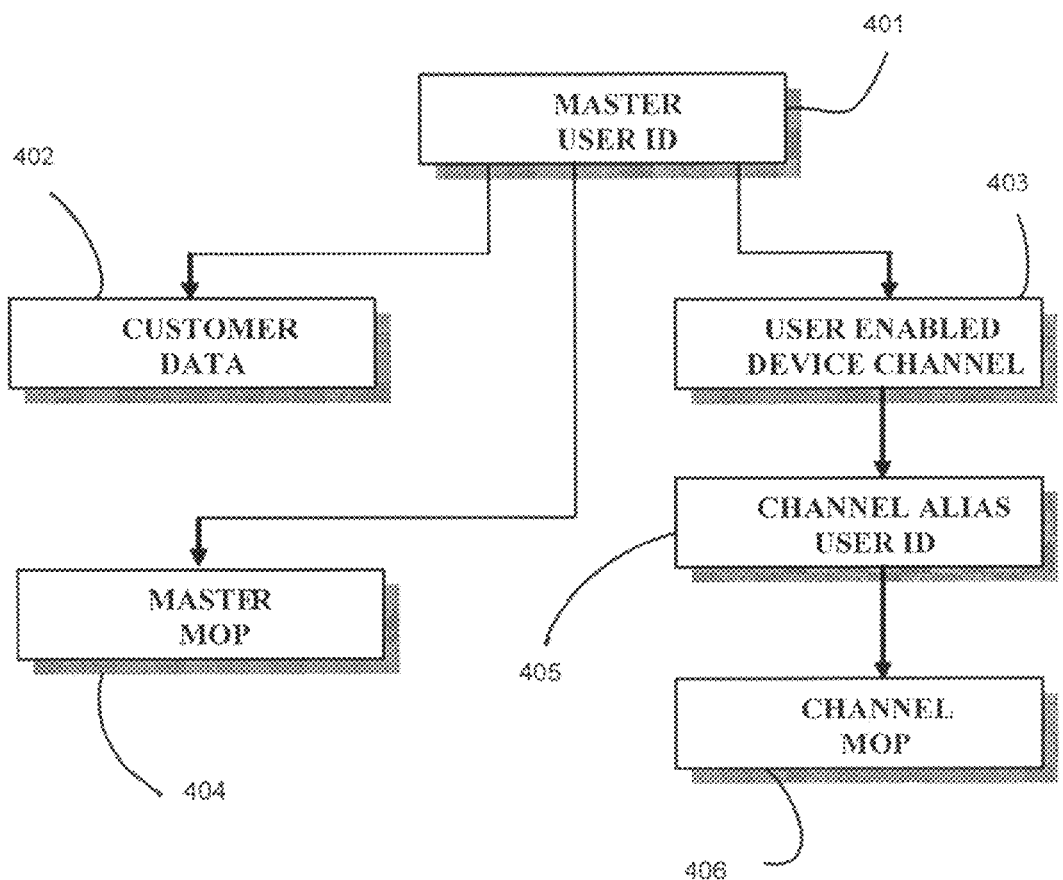
FIG. 4 is an ERD diagram of the user's payment database (Master user Ids, alias Ids and MOPS) depicting the user's method of payment linked to its main identifier and to child "alias" channel-identifiers.

User's identifiers have a main entry associated with a method of payment and may optionally have one or more child identifiers to be used as aliases of the first user identifier when operating on a remote channel-device (see FIG. 4). The communication server 104 is used to receive payment requests coming through the communication network 120, perform validity checks interacting as needed with the security server 106, prepare a payment transaction with data stored on the central database 102 and forward it to the financial server 108. The financial server 108 is configured to interface with one or more financial institutions 151 to perform payment transactions including credit card charges, bank wired transfers, . . . etc. Security server 106 cooperates with the communication server 104 to enforce security by applying checking algorithms of digital signatures and for encrypting and decrypting processes. The system communicates with users through various types of communication devices by exchanging messages from and to the relevant channel-handlers 150, which can be part of the system or external to the system. The communication network 120 can be a public network (e.g. internet) or a virtual private network (VPN, MPLS), a wireless network run by a telecom operator or any combination of them. A virtual private network (VPN) is a communications network tunnelled through another network, and dedicated for a specific network. Users can interact with the platform either by using the networked remote public terminal 122 or other channel-devices such for example a Touch Tone Phone 141, an interactive TV 142, a biometric data reader 146, a personal computer or another internet access device 144, a smart-phone 145, a mobile phone 143 or other device which can also be represented by another automated device 147. Channel-devices are each one different for what relates to the communication—interaction process so each one will be operating on its specific telecommunication channel 140 to be interconnected with a specific channel-handler server 150 in order to communicate with the network 120. A merchant server 124 may be also connected to network 120 to receive or deliver additional features as needed.

Figure 2:
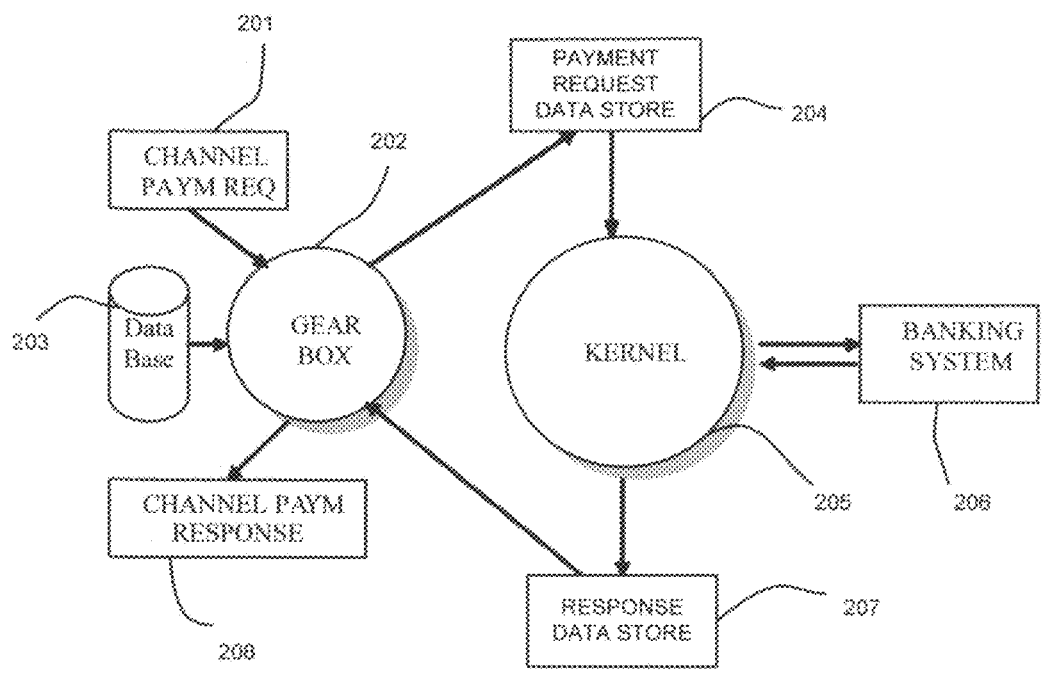
FIG. 2 is a "Pay Robot Mechanism" (Gear Box and Kernel Process) data flow diagram depicting the method of performing a payment transaction by managing the payment request coming from any channel-device in accordance with an embodiment of the present invention.

FIG. 2 illustrates the functionality and interaction among the "Gear Box" 202, the "Kernel" 205 and related databases and interfacing systems. The Gearbox and the Kernel are two interconnect processes. The Gearbox interfaces with the input external systems; the Kernel interfaces with the banking systems to carry out the financial transactions in real time. According to FIG. 2, the Gear Box 202 is a process hosted on the communication server and connected to external channel-handlers in order to receive the payment requests 201 from the interested devices, retrieve from the database 203 the user payment data, composes the payment request 204, apply the transaction by interacting with the kernel 205 and return payment results 208 back to the requesting channel. The Kernel 205 is the process hosted by the financial server, and it works only by standard payment transactions and it is not affected by channel specificity. Its only role is to get a payment request 201 coming from the Gear Box 202, route the payment transaction to the right financial institutions on the banking system 206 and return the response 207 (paid/unpaid) back to the Gear Box 202. The Kernel engine 205 processes standard payment requests 204 (e.g. charge a credit card) coming from the Gearbox 202 and returns the result 207 (paid/unpaid) to the Gearbox 202 and from the Gearbox the Channel Payment Response 208 is returned to the remote terminal to print a bank statement or to the channel-device for special handling.

Any user can access the platform at three different levels: the first as an unregistered user, the second as a registered user, and the third as an advanced registered user.

The first level occurs when the user is unregistered and payment transactions are always carried out independently as EFTPOS transactions using a physical credit or debit card reading on the remote terminal. The second level occurs when the registered user transactions are carried out starting with a positive user's identification without the need of a card reading on the remote terminal. The third level occurs when a registered user accesses the payment platform by using different remote devices other than the public terminal, defined as "channel-devices" such as, for example, a mobile phone, a cable-TV, a PDA, a touch-tone telephone or any other device capable to transmit a payer's specific unique identifier.

Figure 3:
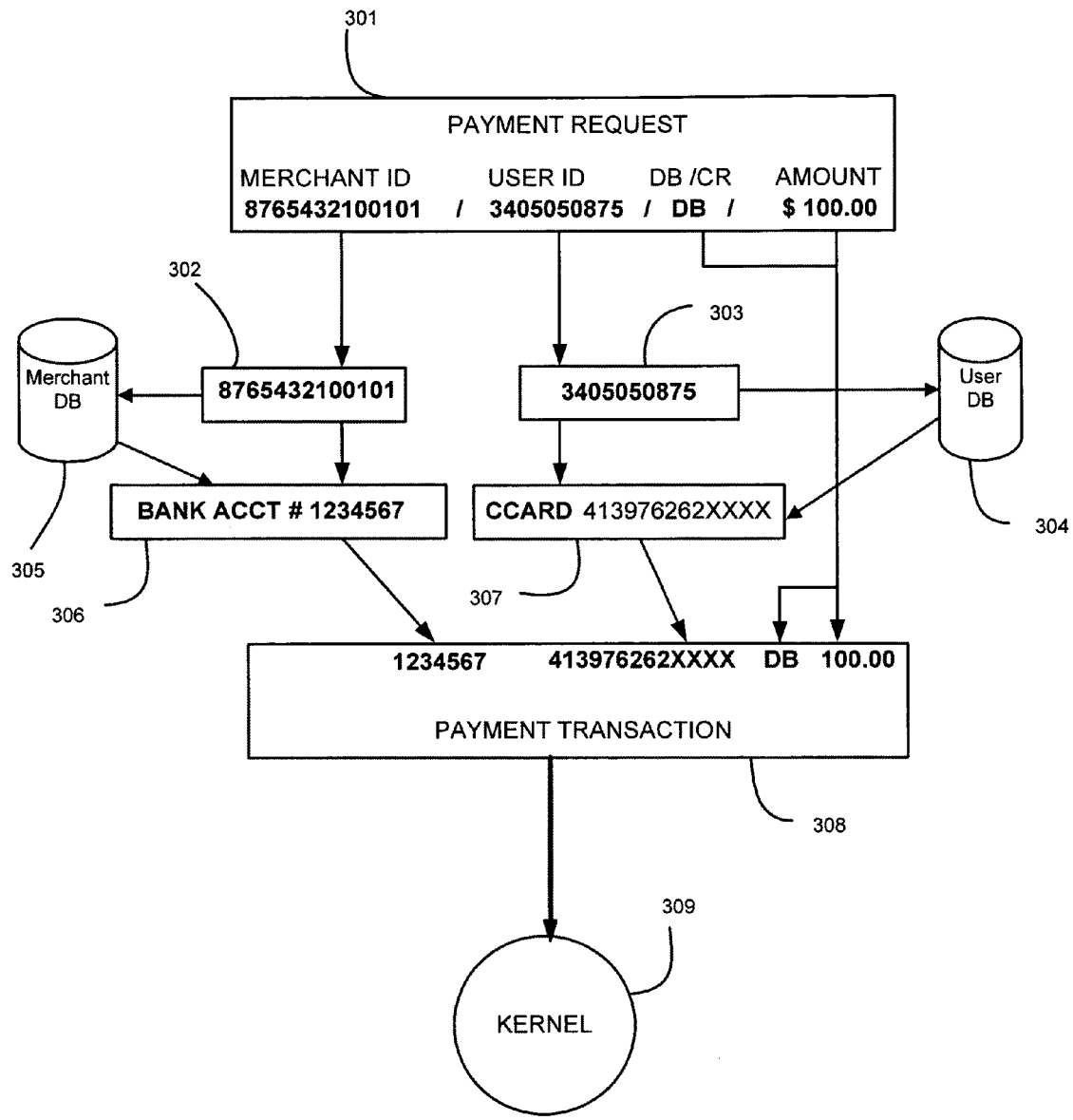
FIG. 3 is a "Gearbox Payment Builder" (Retrieving methods of payment from central database) which depicts how the payment request received is subdivided into relevant codes to retrieve both users and merchant's payment data from the system database in order to perform a bank valid payment transaction, in accordance with an embodiment of the present invention.

FIG. 3 illustrates how the payment request 301 received is subdivided into relevant codes: Merchant ID (seller), User ID (buyer), Debit/Credit, and Amount. The Merchant ID 302 is used to retrieve from the Merchant database 305 the corresponding bank account number of the merchant 306. The User ID 303 is used to retrieve from the User database 304 the corresponding payment card number of the buyer 307. This retrieved information, together with the amount, makes a bank valid payment transaction 308 to be processed by the Kernel 309.

FIG. 4 illustrates an entity relationships diagram of any registered customer's payment data recorded in the central database. Each registered user is recorded into the central database and assigned a Master User ID 401 to which customer data 402 and the chosen method of payment 404 are linked. When the user activates an additional device-channel 403 to operate with the payment platform, then a specific channel entry as alias identifier 405 is created into the database. When the customer wants to use for that specific channel-device a different method of payment other than the standard method 404 then an additional method of payment entry 406 for that specific method of payment is created into the database.

Figure 5:
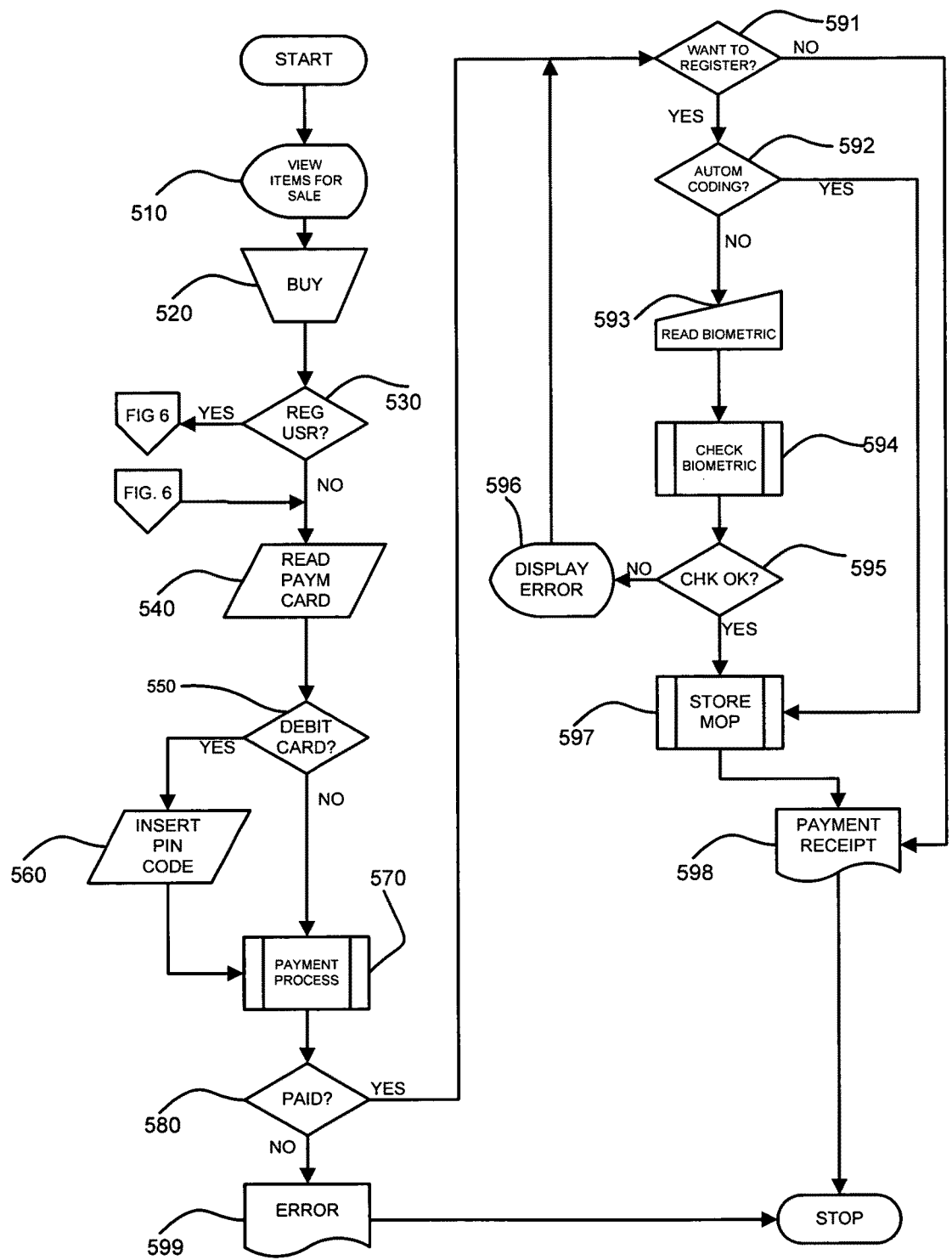
FIG. 5 depicts a payment process with a remote terminal as an unregistered user and subsequent registration phase.

FIG. 5 describes one method of buying on the platform using the remote public terminal 122 as an unregistered user, as it is the case when the user is using the platform for the first time. The user in state 510 is consulting good and services available on the remote public terminal 122 and decides to buy an item. The user goes through the purchase process as it is designed in state 520; then in state 540 the terminal reads the user's payment card (either by insertion or by a contactless connection), follows the instructions and depending on type of payment card used, he/she may be requested to enter a card PIN code to confirm the payment in state 560. In state 570 the communication-server 104 receives the payment request, performs all needed checks to ensure the transaction validity, prepares a payment transaction reading merchant and terminal data from the central database server 102 and routes the request to the financial server 108. The financial server 108 interacts with the relevant financial institution by requesting an online debit transaction for the involved user. The transaction response is tracked down and handled appropriately. In case of positive response, the user payment card is charged with the relevant amount and the payment is directly wired to the merchant bank account. The payment response, along with customer data as appropriate (e.g. in case physical shipment of goods is requested) is also routed to the involved merchant server 124 by means like file transfer or other exchange policy as agreed by contract between the entity running the platform and the involved merchant.

A message is returned back via the communication server 104 to the remote public terminal 122. In state 580, the response is checked, and, in case of negative response, an appropriate error message is returned to the terminal and a memo receipt is printed in state 599. When the payment process is positively completed the user is prompted for automatic registration in state 591. As the registration is not mandatory, if he/she doesn't register, a bank receipt is printed in state 598 and the next time he/she will use a remote terminal the process will be re-executed again in this way, i.e. the remote terminal is used as a multi-merchant EFTPOS-like direct payment device.

In state 591, in case the user accepts the automatic registration option, he/she is asked to choose a personal identification code which it can be automatically generated by the system or acquired through biometric scanning.

In state 592, if the user requests an automatic code generation, the system will register the user into the central database, being its master identifier the computer-generated code and the method of payment data read from the payment card used to complete the payment process.

If in state 592 the user has requested instead biometric scanning, he/she is prompted to go through a fingertip (or other biometric data) reading process. Human fingerprints are unique to each person and can be regarded as a sort of signature, certifying the person's identity. Because no two fingerprints are exactly the same, the process of identifying a fingerprint involves comparing the ridges and impressions on one fingerprint to those of another. This involves capturing the likeness of the fingerprint through use of a fingerprint scanner (which takes a digital picture of a live fingerprint). Once the biometric image is captured in state 593, the process of identification involves the use of complex algorithms to compare the specific features of that fingerprint to the specific features of one or more fingerprint images that have been previously stored in a database. Normally this software algorithms are included as part of the fingerprint scanner which automatically provides as an output a digital code that is a computer image of the fingertip. In state 595, the generated code is checked against the codes already present in the central database in state 594. If the fingertip (or other biometric code) is new, then in state 597 the user is registered into the central database being its master identifier the fingerprint image and as the method of payment (MOP), the payment card just used to positively complete the payment process. A memo receipt is printed on the terminal listing also an alternative computer generated code (other than the fingertip image code) in clear and an operation PIN in state 598. The reason for the alternative code is to allow the user to interact with any given terminal when the biometric recognition fails or is missing. If, for any reason, the biometric code is not new in the system, an error is displayed in state 596, the registration process cannot be completed and the user can always choose to proceed again with the automatic code registration or to stop the registration process in state 591.

Figure 6:
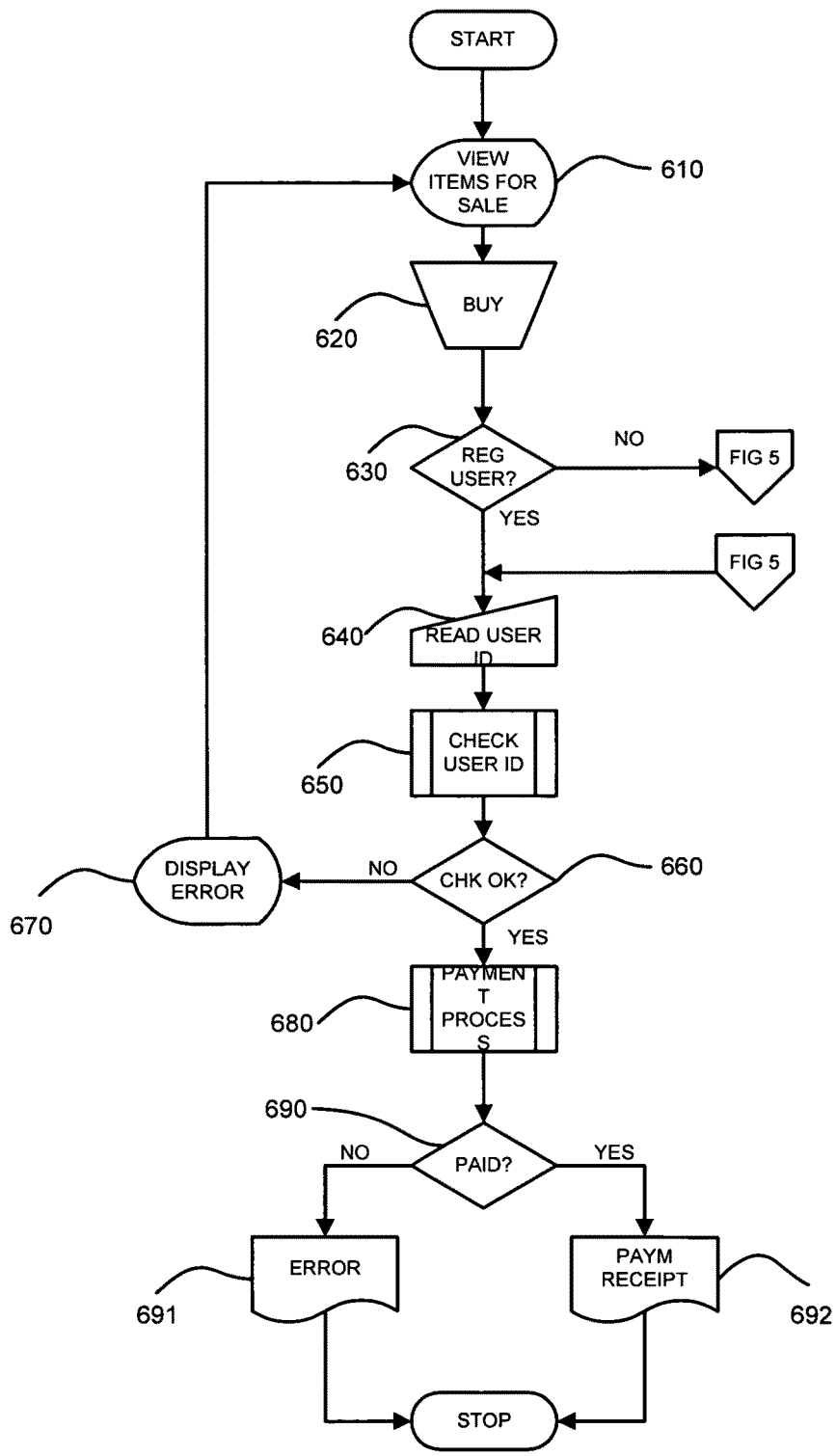
FIG. 6 depicts a payment process with a remote terminal as a registered user using a personal identification code.

FIG. 6 illustrates another method of buying on the platform using the remote public terminal 122 as a returning user which has already being registered on the system platform either by the automatic code generation or by a fingertip data reading. The user in state 610 is viewing good and services available on the remote public terminal 122 and decides to buy an item. The user goes through the purchase process as it is designed in state 620. When buying, in state 630, the user selects whether he/she is a registered user by appropriate action and proceeds by identifying himself/herself in state 640 either by using his fingertip or entering his identification code and PIN number or letting the terminal read the barcode identifier, depending on how the registration process was previously done. The remote public terminal 122 reads the identification code, and in state 650, via the communication server, queries the central database to seek user information. In state 660, if the user is not found, an error is displayed in state 670 and the process returns in state 610. If the user is found, state 680 starts a transaction with the communication server to compose a payment transaction reading the user's method of payment associated to his identifier, merchant and terminal data from the central database server 102 and routes the request to the financial server 108. The financial server 108 interacts with the relevant financial institution by requesting an online debit transaction for the buyer user. The payment response, along with customer data as appropriate (e.g. in case physical shipment of goods is requested) is also routed to the involved merchant 124 by means like file transfer or other exchange policy as agreed by contract between the entity managing the platform and the involved merchant. The transaction response is tracked down and handled appropriately. In case of positive response, the user method of payment is charged of the relevant amount and the payment is directly wired to the merchant bank account. In state 690 a message is returned back via the communication server 104 to the remote public terminal 122 stating the process is complete and prints a valid bank receipt in state 692. In case of negative response, an appropriate error message is returned to the terminal and a memo receipt is printed in state 691.

Figure 7:
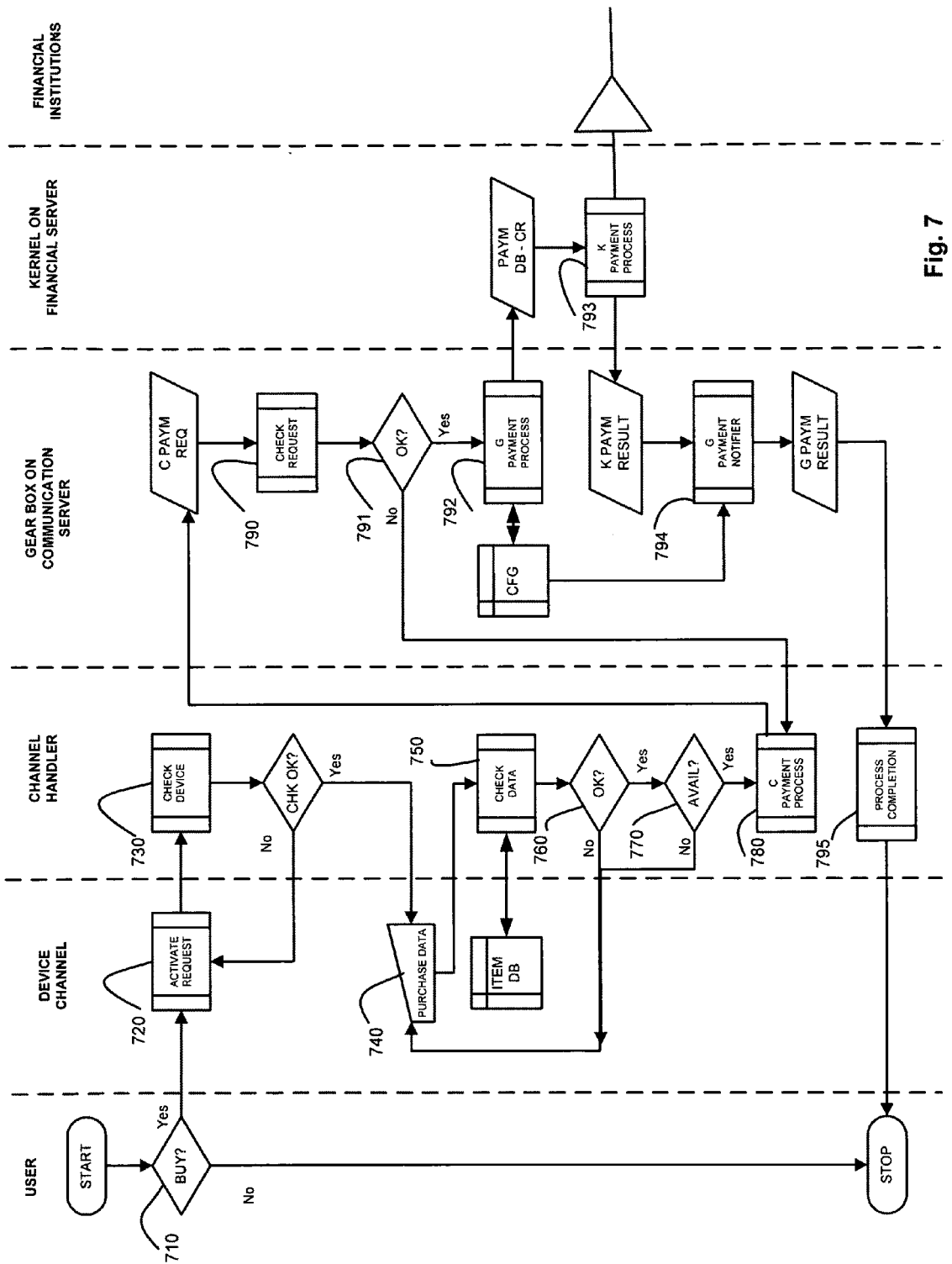
FIG. 7 is a Channel-device payments schema depicting a generic flow for a payment process using a channel device.

FIG. 7 illustrates the payment on the platform using multiple channel devices and corresponding embodiments of the invention. As another method of entering a payment transaction, the user can operate the platform using other remote terminals, defined as "channel-devices". A channel-device is any device capable of data transmission which can be associated with an identifier unique to it, either using physical information or a virtual one associated to it. Unique identifiers can be for example a telephone number, a mobile phone IMSI, a mobile phone IMEI, a smart card ID, a public IP address, a MAC address, a biometric image, a voiceprint.

Here are a few examples of channel-devices with the corresponding unique identifiers:

| Channel-device | Unique Identifier | example | type |
| --- | --- | --- | --- |
| Domestic touch tone telephone | PSTN/ISDN telephone number | 303-758-0355 | virtual |
| Mobile phone | IMSI number | 720-123-5643 | virtual |
| Mobile phone | IMEI number | 350077-52-323751-3 | physical |
| Interactive TV | Smart card number | 000123456789 | physical |
| Interactive TV | Subscriber code | 77267262 | virtual |
| Personal computer | MAC Address | 00-14-C2-E5-50-2E | physical |
| Personal computer | Public IP address | 85.32.244.115 | virtual |
| Personal computer | User ID | guest | virtual |
| Smart phone | MAC address | | physical |
| Smart phone | Public IP address | 88.43.232.211 | virtual |
| Smart phone | Fingertip image | undefined | virtual |
| Smart phone | User ID | | virtual |
| Car | Plate number | 009 266 1998 | physical |
| Car | Car frame RFID | USJFJH87762JJJS | physical |
| Biometric reader | Biometric image | | virtual |
| Two way pager | IMSI number | 001-333-876-9087 | virtual |
| Two way pager | IMEI number | 359367-00-283773-0 | physical |
| Voice recognition | Voiceprints | undefined | virtual |

To enable a channel-device to execute payment requests, the user must first register it into the system by inserting the proper channel-identifier as an "alias" identifier for the master identifier. It is possible then for a given user to have a master code to be used when operating as a registered user with the remote public terminal 122 and, at the same time, to have unlimited additional alias identifiers as needed to execute payments with other devices. Registration of additional codes can be done either by entering the code by operating with the remote public terminal 122 (FIG. 1) or, in some cases, directly from the device.

The first embodiment relates to the payment on the platform using a touch-tone telephone device 141 (domestic and mobile phones) calling the merchant-related IVR (Interactive Voice Recognition). The user sees an item for sale by an enrolled merchant (e.g. TV shopping channel, newspaper, magazine advertisement) and decides to buy the item in state 710. The user then calls with his already enabled touch-tone telephone 141, dialing the dedicated telephone number to proceed with the purchase in state 720. The merchant IVR traps the user's telephone number (fixed line or IMSI) and checks, in state 730, if the number is stored in the alias list in the central database by interconnecting to the system platform or by accessing a local database. If the telephone number is not found, then a voice message terminates the call (e.g. user is not enabled). In case the telephone number is found, the user is recognized and he/she is asked to type, by pressing the telephone keys, the item code of the good or service he/she wants to buy and its quantity, as applicable, in state 740. Once received the item code, the IVR voice repeats the item code and requests a confirmation from the user. In case of no confirmation, the user is asked to re-enter the item code or to abandon the session. In case of confirmation, the item code is checked for validity in state 750. If the item code is not found, then the user is asked to re-enter the item code or to abandon the session in state 760. In case the item code is found, the IVR requests a confirmation from the user. In case of no confirmation, the user is asked to re-enter the item code or to abandon the session. In case of confirmation, the merchant may also perform other internal checks (e.g. availability of the goods etc) and handle the situation appropriately in state 770. When the purchase order is correctly in place, the item price is found and the total amount is computed, the IVR calls the platform by transmitting his merchant-code, the user's telephone number and the total amount to be paid in state 780. The communication server 104 checks the received request for validity in state 790. If the request is invalid, an appropriate message is returned to the caller in state 791 otherwise it prepares a payment transaction by accessing the central database 102 retrieving merchant and user's payment data and sends them to the financial server 108 for online transaction processing in state 792. The financial server 108 receives the standardized payment request and conducts the real payment transaction interacting with external financial institutions in state 793. The payment result (paid or not paid) is returned back to the communication server 102 which, where required, retrieves all users' data (e.g. name, billing address, . . . etc.) and delivers it to the caller merchant server in state 794. The merchant IVR reads payment results and notifies accordingly the user in state 795.

Another embodiment of the invention is to pay on the platform using an interactive TV set 142, using a return path, which is the connection that allows to send to the central TV system commands entered by the user via the remote control. The connection is usually made via a telephone line using the internal modem of the TV decoder or via the internet. The user has seen an item for sale by an enrolled vendor merchant (e.g. on a TV shopping channel) and decides to buy it in state 710. The user then uses the TV remote control to activate the purchase order in state 720 (screen interaction to be provided by the TV broadcaster). The request is received on the TV-channel-handler to be checked for validity in state 730. If the request is invalid (e.g. user not authorized) the process stops otherwise the user can continue by entering purchase data as seen on TV which must be accompanied by the item-related vendor merchant code (either as a separate code or a part of the item code itself) and the desired quantity in state 740. The code is then received and checked by the TV merchant server via the return path as usual and the return path is interconnected with a merchant server which could already be in place for other functions, the merchant server being the channel-handler in state 750. The message received contains the item code, quantity, the vendor merchant code and the subscriber's code (or smart card code). The merchant server recognizes the user intention to buy on the payment platform so it retrieves the item amount to be paid either by a local database or by accessing to another remote database. If the item is not found, the situation is appropriately handled by returning an error message to the TV screen in state 760, otherwise, if necessary, a check for availability is done in state 770. If not available, the process stops otherwise the item price is found and the total amount is computed. It routes the payment request along with the TV subscriber code (or smart card number as applicable) as the alias code to the communication server of the platform in state 780. Once the communication server receives the request, it checks user data using the subscriber-number as alias identifier (or smart card number) in state 790. If the alias identifier is not present, the process fails in state 791, otherwise it prepares a payment transaction by accessing the central database retrieving merchant and user's payment data and sends them to the financial server for online transaction processing in state 792. The financial server then receives the payment request and conducts the real payment transaction interacting with external financial institutions in state 793 and returns the result to the communication server in state 794. The payment result (paid or not paid) is returned back to the to the TV broadcaster server that reads payment results and notifies accordingly the user on the TV screen in state 795. In case of positive payment result, if the vendor merchant is not the TV broadcaster itself, then the TV broadcaster returns full customer data to the vendor merchant for proper order processing (e.g. for billing and shipment as applicable).

Another embodiment of the invention is to pay on the platform using a biometric data reader device 146 (e.g. fingertips, hand, eye, face, voice recognition).

When the access is restricted or subject to a payment (e.g. baseball game entry, company's canteen . . . etc.) the data reader can be interfaced with the platform in order to charge the access without having the user or the merchant ask for any method of payment. A biometric data reading device 146 is placed to identify and authorize user access to the platform in state 710. The user places his finger (or other biometric element) for reading with a biometric device, which can optionally have a keyboard to request a specific function in state 720. Biometric information is scanned and sent to the dedicated computer server (channel-handler) in state 730 which hosts an application in order to query the platform's central database by providing as alias code the scanned image code. If the alias code is not found, the access is denied. If the alias code is found, then the application, accordingly to the requested function, retrieves from its database or otherwise determines with any other means the amount to be paid in state 740, afterwards it optionally checks for validity and availability in states 750, 760 and 770. If data are correct, it calls the platform's communication server providing the user alias code, the merchant code, the amount to be paid and waits for the response in state 780. Once the communication server receives the request, it checks user data using the biometric image code as alias identifier in state 790. If the alias identifier is not present, the process fails in state 791, otherwise it prepares a payment transaction by accessing the central database retrieving merchant and user's payment data in state 792 and sends them to the financial server for online transaction processing. The financial server receives the payment request and conducts the real payment transaction interacting with external financial institutions in state 793. The payment result is returned back to communication server in state 794 and to the channel-handler to allow or deny access as a consequence of a paid or not paid transaction in state 795. Another embodiment of the present invention consists by using a method of automatic payment on the platform with an optical recognition device 147 (camera).

A camera is placed to identify a subject and charge a user according to the specific implementation. The camera reads the identifier as an alias code (e.g. car plate number of a vehicle accessing a restricted town area or using a toll bridge or a toll highway) and sends this information to its channel-handler (server) in state 720. The channel-handler server hosts an application to manage the camera scanning in state 730. Depending on a number of different pre-configured variables (e.g. camera location, time etc. . . . ) the transaction amount in determined in state 740. The channel-handler then calls the platform's communication server providing the user alias code, the merchant code, the amount to be paid and waits for the response in state 780. Once the communication server receives the request, it checks user data using the scanned code as alias identifier in state 790. If the alias identifier is not present, the process fails in state 791 otherwise it prepares a payment transaction by accessing the central database retrieving merchant and user's payment data and sends them to the financial server for online transaction processing in state 792. The financial server receives the payment request and conducts the real payment transaction interacting with external financial institutions in state 793. The payment result is returned back to communication server in state 794 and to the channel-handler to manage the consequences of a paid or not paid transaction in state 795.

Another embodiment of the invention is to allow the user to pay on the platform with a mobile phone 143 using SMS text messaging. The user wants to make a payment with his/her mobile phone 143 while he/she is not at the presence of the payee (e.g. to pay a parking ticket) sending an SMS to the channel-handler 150 containing a specific payment code. The payment code was prepared by the payee on the relevant medium (e.g. printed on a bill) containing the payee identifier, the item number, the amount to be paid and a final check digit (e.g. PPA123456X100Y). The SMS-channel-handler 150 receives the SMS and checks it for validity; in case the SMS is invalid the transactions is aborted and an invalid message is returned via SMS to the caller mobile phone. In case of SMS validity the payee code is internally translated, by accessing a locale database table, to a real merchant code. If the payee code doesn't exist in the table the transaction is aborted and an invalid message is returned via SMS to the caller mobile phone, otherwise the channel-handler 150 calls the communication server 104 passing to it a standard payment request which includes the retrieved merchant code, the item number, the customer alias code (IMSI or IMEI) and the amount to be paid. The communication server 104 checks, by querying the database server 102, if the IMSI or IMEI number is in the list of enabled alias codes. In case the IMSI or IMEI number is not found the transaction is aborted otherwise the communication server 104 prepares a payment request by accessing the central database 102 retrieving merchant and user's payment data and sends them to the financial server 108 for online transaction processing. The financial server 108 receives the standardized payment request and conducts the real payment transaction interacting with external financial institutions. The payment result (paid or not paid) is returned back to the SMS-channel-handler to notify via SMS the customer and to the payee merchant server 124 according to the file exchange policy subscribed by the payee when enrolled on the platform.

Figure 8:
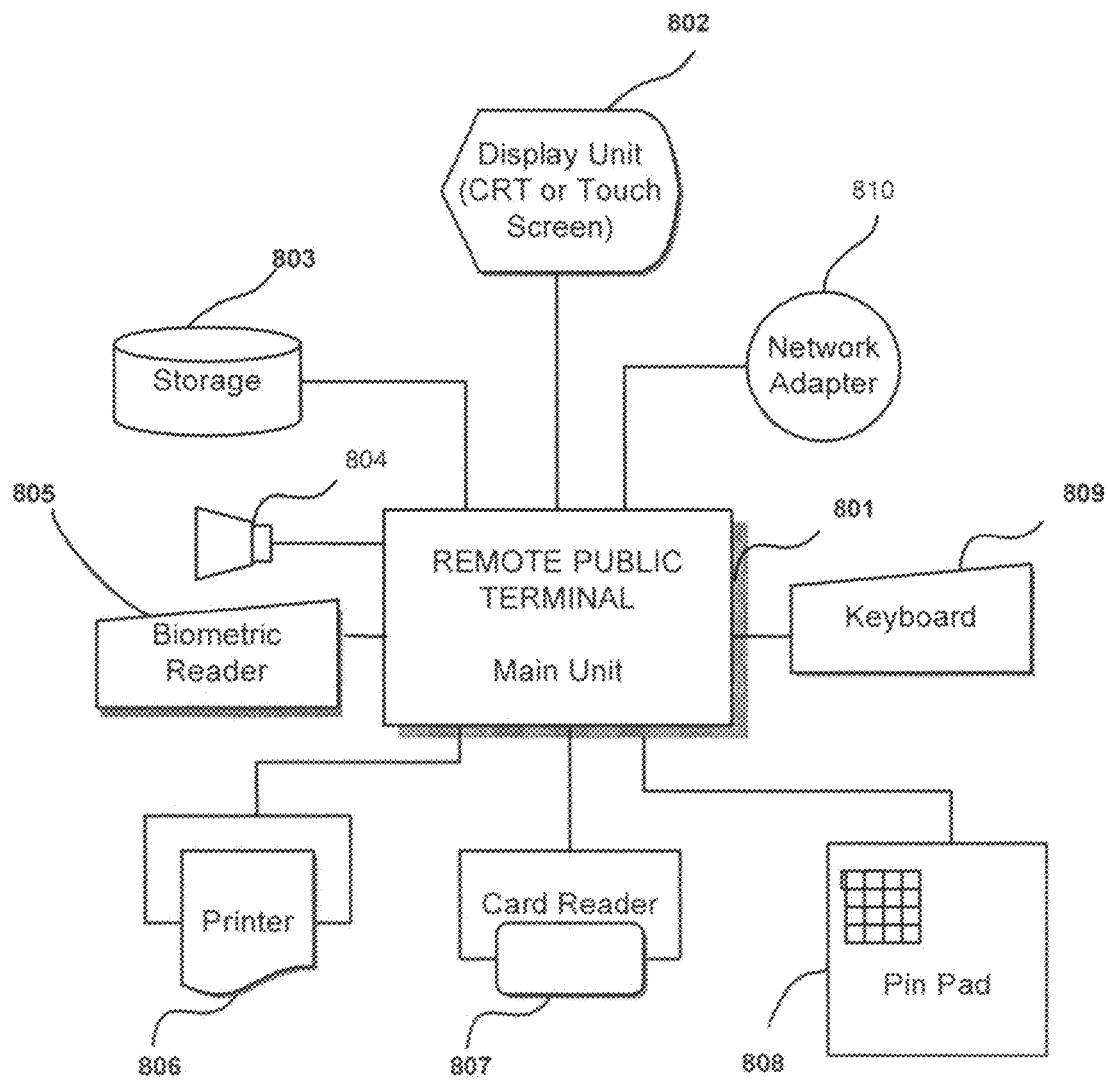
FIG. 8 depicts the remote public terminal components layout.

The novel remote public terminal, as disclosed in this invention and illustrated on FIG. 8, is a dedicated, networked self-service device capable of displaying merchant contents, accepting payment requests from a public user and printing a bank receipt of the payment transaction, after its execution. The remote public terminal, illustrated on FIG. 8, operates in two different ways, the first being intended to handle unregistered users while operating as a multi-merchant EFTPOS-like device, where each payment requires the physical reading of a payment card (debit or credit) by the card reader. The second being an advanced feature reserved to registered users, no longer requiring entering payment data to start the payment process. To allow user interaction and registration, besides the standard input devices, the remote public terminal can be equipped, according to a second embodiment, with a biometric data reader 805 such as fingertip, hand, face, eye recognition device or a combination of them (multi-biometrics). The remote public terminal can be of any shape, form, color and size (e.g. wall-mount, kiosk, desktop, embedded in another structure ... etc.) and its fundamental components are a touch-screen 802 (or keyboard 809+standard screen), a small payment receipt printer 806, a biometric data reader 805, a payment card reader 807, a pin-pad 808 and an on-line network wired or wireless connection 810 with the central system. It can be optionally equipped with other devices such as a barcode reader, a RFID or other contactless device readers and loudspeakers 804. The remote public terminal also has an internal storage device 803 to store software and other data, as needed.

The central system may comprise one or more system servers like a communication-server, a database-server, a financial-server, all networked together with the remote public terminals. The network underlying the platform can be either a virtual private network (VPN), a public network (Internet) or a private network. An interconnection with the public internet allow users to remotely operate using a personal computer, a smart phone, a PDA or any other internet connecting device to log-in to the system web portal as registered users to carry out management operations, consult in real-time their payment transactions or request printing of reports or payment confirmations. Management operations include the possibility to add "alias" identifiers to enable purchasing channels with other devices or to cancel the user's registration partially or in full. A system according to the spirit of this invention requires a number of remote terminals, as previously described, and at least one highly accessible computer server to receive and process payment requests, a database server configured to store enrolled merchant bank accounts numbers, users identification codes and aliases along with the corresponding payment methods, a computer server dedicated to connect to financial institutions to carry out real time payment transactions. The payment platform can be accessed by other remote devices interconnected by specific channel-handlers made of telecommunication lines, computer servers, routers, switches or any other components able to establish a connection between the device and the system. A security system is added, as necessary, by adding security servers, routers and firewall implementations. Examples of specific Channel-handlers are IVR (Interactive Voice Response), SMS gateways and computer servers. In telephony, IVR is a phone technology that allows a computer to detect voice and touch tones using a normal phone call. The IVR system can respond with pre-recorded or dynamically generated audio to further assist callers with instructions. IVR systems can be used to control almost any function where the interface can be broken down into a series of simple menu choices. Once constructed, the IVR systems are generally able to handle large call volumes. An SMS gateway is a service providing an interface between SMS messages coming from mobile phones and other protocols. Message Service Centres (MSCs) communicate with the Public Land Mobile Network (PLMN) or PSTN via Interworking and Gateway MSCs. Specific channel-handlers could be coupled with a computer server in order to establish the right protocol data exchange with the payment platform. Data exchange between the external channel-handlers and the communication server of the system platform should be enforced using a "service oriented" approach like SOA as the current state of the art. Service Oriented Architecture (SOA) is a computer systems architectural style for creating and using business processes and packaged as services. SOA also defines infrastructure to allow different applications to exchange data and participate in business processes. SOA separates functions into distinct units (services), which can be distributed over a network and can be combined and reused to create business applications. These services communicate with each other by passing data from one service to another, or by coordinating an activity between two or more services. SOA unifies business processes by structuring large applications as an ad hoc collection of smaller modules called services which can be called by external applications. XML has been used extensively in SOA to create data which is wrapped in a description container.

In one embodiment of the invention, a payment transaction is activated by a user operating with the remote public terminal 122. After the selection is completed, the user is prompted to proceed with the payment so the user is asked if he/she is a registered user.

Following is the procedure to activate usage of a channel-device using the remote public terminal 122. The user selects the functionality by following proper instructions and identifies himself/herself on the terminal by his fingertip or by inserting his identification and PIN code. The remote public terminal 122 checks if the identification is valid. If the identification fails the process is stopped otherwise the user is asked to provide the new alias identifier along with the corresponding channel-device (e.g. touch tone phone, 303-758-0355) from a pre-configured list of possible channel-devices (e.g. fixed line telephone, pay TV, smart phone, two way pager etc). The remote public terminal 122 checks the entered information for data consistency and validity as needed (e.g. number length, code compatibility between the entered code and the channel-device). In case of inconsistency, the user is asked to correct information or to abandon the process. If the new code consistency is valid, the terminal, via the communication server 104, checks if the code was not already stored in the database server 102 from the same user or any other user. If the new code is already present, the user is asked to correct information or to abandon the process. If the new code is not present then this new code is stored in the central database server 102 and it will be asked to choose if he wants to keep the same method of payment of the master code or if he wants to associate another method of payment to the new code (e.g. another credit card). If the user doesn't change the method of payment, the new alias code is linked to the master code otherwise the terminal requires reading of a new payment card (either by insertion or by a contactless connection) so it can be checked. After the card has been read, the remote public terminal 122 requests the communication server 104 to make a "dummy" online payment transaction of symbolic amount (e.g. 1 cent) which will not be confirmed. If the payment transaction returns positive response, the new card is considered valid on the banking system and it is not stolen, blocked, expired, and black listed. The new card is then associated with the new alias identifier.

Following is the procedure for changing the method of payment using the remote public terminal 122. The user selects the functionality by following proper instructions and identifies himself/herself on the remote public terminal 122 by his/her fingertip or by inserting his/her identification and PIN code. The remote public terminal 122 checks if identification is valid. If the identification fails, the process is stopped, otherwise the remote public terminal 122, via the communication server 104, retrieves the master's code, all alias identifiers for enabled channel-devices along with the relevant method of payment. The user is asked if he/she wants to globally replace all with a new method of payment or if he/she wants only to change a specific entry. If the user wants a global replace, then the terminal requires reading of a new payment card (either by insertion or by a contactless connection) so it can be checked. After the card has been read, the remote public terminal 122 requests to the communication server 104 to make a "test" online payment transaction of symbolic amount (e.g. 1 cent), which will not be confirmed. If the payment transaction returns positive response, the new card is considered valid on the banking system and it is not stolen, blocked, expired, and black listed. The new card is then associated with all user's identifiers. If the user wants to replace a specific method of payment the he is prompted with a list of all active identifiers along with the corresponding method of payment. The user then selects which method wants to change and the terminal requires reading of a new payment card (either by insertion or by a contactless connection) so it can be checked. After the card has been read the terminal requests a "test" online payment transaction of symbolic amount (e.g. 1 cent) which will not be confirmed. If the payment transaction returns positive response, the new card is considered valid on the banking system and it is not stolen, blocked, expired, and black listed. The new card is then associated with the selected identifier. At the end of the process the result is displayed on the screen and a memo receipt can be printed.

Following is the procedure for the total deactivation of a user or deactivation of a specific channel-device only using the remote public terminal 122. The user selects the functionality by following proper instructions and identifies himself/ herself on the terminal using the fingertip or by inserting his identification and PIN code. The remote public terminal 122 checks if identification is valid by requesting it to the communication server 104. If the identification fails, the process is stopped, otherwise the user is prompted to select "total deactivation" or "specific deactivation". If the user selects "specific deactivation", the user is prompted with the list of all alias codes associated to his master code and to the corresponding channel-devices (e.g. fixed line telephone, pay TV, smart phone, two way pager etc). The user selects what entry wants to deactivate, the remote public terminal 122 connects to the communication server 104 by sending the master code, the alias code to be deleted. The communication server 104 retrieves relevant information from the central database server 102 and deletes the specific alias identifier from the central database. If the user selects "total deactivation" the terminal 122 connects to the communication server 104 by sending the master code to be deleted. The communication server 104 retrieves relevant information from the central database server 102 and deletes the master code and all its children records as the specific alias identifiers from the central database along with payment of method and all other user related information were stored. The result is sent back to the terminal 122 to display proper information and prints a memo receipt.

Following is the procedure for the Activation/Deactivation of a channel-device using the device itself. It is also possible to activate or deactivate a channel-device directly using the device to be deactivated. This is done by contacting the proper channel-handler which is enabled to create a communication bridge to the platform. These channel-handlers are to be considered as part of the payment platform:

a) Touch phone 141: using the interested telephone line, the user calls a dedicated telephone number connected to an Interactive Voice Responder (IVR) to guide him/her through the activation or deactivation process. This IVR is not related to a specific merchant. For this use, it can be considered as part of the platform being the DTMF-channel-handler. The IVR asks the user to identify by typing on the telephone numeric keyboard his master identification code and the PIN number. The IVR is interconnected with the system to check user data. If the identification fails, the process is stopped, otherwise a check is done to verify if the caller ID of the telephone line is already in use for that user. If the number is not present, the only choice possible is the activation so the user is voice prompted with a summary of his stored information and asked to confirm activation of the alias code, which in this case will be automatically detected by the IVR being the caller ID of the telephone line he/she is using. Upon user confirmation, IVR requests to the communication server to check if the telephone number was not already stored in the database from the same user or any other user. If the telephone number is not present then it is stored in the central database and the new alias code is linked to the master code. If the telephone number is already present, the user is voice prompted with a message stating his/her telephone number is already active and if he/she is requesting a deactivation. The user the can confirm deactivation or abandon the process. In case of deactivation the alias code (i.e. the telephone number) is deleted from the central database. At the end of the process its result (activated or deactivated) is returned to the user with a vocal message.

b) Interactive TV 142: if the TV broadcaster is an enrolled merchant, then he/she could add a simple screen interaction by which the user, using the TV remote control, can request the activation by inserting his/her master identification code and PIN number to activate the payment capability using the TV return path. The TV return path is interconnected with a merchant server (TV-channel-handler) which could already be in place for other functions. The merchant server recognizes the user intention to enable his/her TV on the payment platform so it routes the request along with the TV subscriber code (or smart card number as applicable) as the alias code to the payment platform. Once the platform receives the request, it checks the user data. If the identification fails, the process is stopped, otherwise the communication server checks if the TV-subscriber-number (or smart card number) was not already stored in the database from the same user or any other user. If the TV-subscriber-number is already present, the process fails, otherwise it is automatically stored in the central database and the new alias code is linked to the master code. Similarly, the deactivation is done by having the user requesting it by following the screen instructions. The request is routed to the TV channel-handler which recognizes the request and sends to the platform the subscriber's code as the alias code along with the deactivation request. The communication server checks if the subscriber's alias code is in use by accessing to the central database. If the user is not found, the process is stopped, otherwise the alias code (subscriber's code) is deactivated either by a cancellation of its entry or by a logical flagging. The action (error or deactivation) is returned to the TV-channel-handler for proper handling.

c) Mobile phone 143 using the DTMF method with IMSI detection. Using the interested mobile phone, the user calls a dedicated telephone number connected to an Interactive Voice Responder (IVR) to guide him/her through the activation/deactivation process. This method is similar to what is described for use with a touch telephone, but there is a difference about the alias identifier, which, in this case, will be the IMSI, i.e. the cell phone subscriber's number instead of the fixed line telephone number. Once enabled, the platform can receive payment requests from this mobile phone user recognizing him/her by the IMSI number which is transmitted in both cases of SMS and DTMF purchasing methods.

d) Mobile phone 143 using the SMS method with IMSI detection. Using the interested mobile phone, the user sends an SMS to a dedicated telephone number connected to an SMS gateway. The SMS gateway is not related to a specific merchant, so, for this use, it can be considered as part of the platform being the SMS-channel-handler. The message text to be sent will contain only the phone identifier method (IMSI or IMEI), its master identification code and the PIN number (e.g. IMSI*12345678*12345). The SMS gateway is interconnected with the system to check user data. If the identification fails, the process is stopped, otherwise it automatically detects the IMSI number as the alias code and requests the communication server to check if the IMSI number was not already stored in the database from the same user or any other user. If the IMSI number is already present, the process executes a deactivation, otherwise it is stored in the central database and the new alias code is linked to the master code. Once enabled, the platform can receive payment requests from this mobile phone user recognizing him/her by the IMSI number which is transmitted in both cases of SMS and DTMF purchasing methods. The deactivation is done by cancelling the IMSI entry from the central database. The SMS gateway then returns an SMS message to the calling mobile phone with the result (user activated or deactivated). The same method is applicable to the IMEI number, if the user wants to link payments to the physical handset instead of the telephone number (i.e. payments can be applied regardless of the telephone operator and SIM card he is using in that moment). IMEI detection is automatic on a mobile network so the text message should be composed only by differentiating the prefix in order to instruct the SMS gateway of what type of identifier he/she wants to use (e.g. IMEI*12345678*12345).

In another embodiment of the invention, the user can register himself or herself on the payment platform using a bank ATM (Automated Teller Machine). The bank ATM, just likely the remote public terminal 122, can be used to interact with the platform and allow a user to register. This can be accomplished at any location where the remote public terminal 122 is not available. In this case, the system can be seen as a central payment platform, whose users are enrolled by using standard bank ATM terminals and payments are carried out using channel-devices. The user, after the ATM terminal has read the payment card (either by insertion or by a contactless connection), requests the registration into the platform. The ATM is then connected to the system which will automatically register the user into the central database using, as a master identifier, a computer-generated code and the method of payment the payment card just read by the ATM. The user is then asked to provide the alias identifier along with the corresponding channel-device (e.g. touch phone, 303-758-0355) from a pre-configured list of possible channel-devices (e.g. fixed line telephone, pay TV, smart phone, two way pager etc). The ATM terminal then checks the entered information for data consistency and validity as needed (e.g. number length, code compatibility between the entered code and the channel-device). In case of inconsistency, the user is asked to correct the information or to abandon the process. In case of consistency, the ATM terminal, via the communication server 104, checks if the code was not already stored in the database server 102 from the same user or any other user. If the new code is already present, the user is asked to correct information or to abandon the process. If the new code is not present, then this new code is stored in the central database server 102 and linked to the computer-generated master identifier code.

Various modifications to the disclosed embodiments and the general principles defined can be applied to other embodiments without departing from the scope of this invention. The invention described is not limited to the shown embodiments but is to be accorded to the widest range of applications still be consistent with the described concepts and principles and as better defined in the annexed claims. The telecommunication environment used to illustrate the present embodiments comprises electronic devices and telecommunications lines whose technical details (e.g. type of processor, memory etc) are omitted because known as state of the art and because not relevant in defining the methods itself, that can be build on a variety of different combinations of such devices and technologies, present and future.

What I claim is:

1. A system to process commercial transactions between multiple merchants previously registered to the system and eager of selling products and services and users desiring to purchase said products or services from said registered merchants; said users being able to use a plurality of channel devices for initiating said commercial transactions without supplying more than once sensitive financial and personal payment data; said system automatically generates real time Point of Sale (POS) financial payment electronic transactions to credit merchants' bank accounts and debit user's elected payment instrument; said electronic transactions being automatically generated using data of merchants and data of users that have been previously entered and stored in the system on multiple database servers; said system comprising one or more computer and a computer memory combined with a processor; said computer memory is capable of storing instructions to process commercial transactions between users and merchants without:

negotiations between the merchants and the users;
    using a third party intermediary;
    the users holding a monetary account within the system;
    granting user's credit line or holding of a credit source;
    processing ACH (automated Clearing House) transactions;
    the users maintaining multiple payment instrument accounts within the system;
    the need of the users to use a computer or a web browser;
    the merchants having a web server in operation;
    the merchants receiving payment information from the users;
    the users sending payment information to the merchants;
    interaction between the user's and the merchant's computer systems;

and wherein said computer stored instructions allow said users to perform the functions of:

a. activating the usage of a channel device using a remote public terminal;
    b. changing a method of payment using a remote public terminal;

c. totally deactivating a user itself using a remote public terminal;
d. specifically deactivating a user's use of a specific channel device using a remote public terminal;
e. activating or deactivating a channel device using the device itself.

2. A system according to claim 1 wherein said plurality of channel devices are selected from the group consisting of:
remote public terminals;
touch-tone telephones;
mobile telephones;
interactive digital television sets;
biometric readers;
optical readers;
personal computers (PC);
personal digital assistants (PDA);
automated teller machines (ATM).

3. A system according to claim 1, further comprising:
a. at least one channel-specific network to which can be connected said plurality of channel devices;
b. at least one related channel handler to allow channel devices to be connected to a communication network;
c. an optional plurality of remote public terminals;
d. at least one merchant server;
e. at least one communication server used to receive payment requests from a communication network;
f. at least one central database to store information related to merchants, users and their methods of payment;
g. at least one security server to enforce security by applying checking algorithms of digital signatures and for encrypting and decrypting data;
h. at least one financial server configured to interface with one or more financial institutions.

4. A system according to claim 1, wherein said user utilizes a channel device to execute the purchase of selected items for sale performing the functions of:
a. viewing the items for sale;
b. selecting the item(s) to purchase;
c. providing a payment instrument identification if said user is not already registered to said system;
causing the computer stored instructions to perform the following functions:
a. processing a payment of the sale amount of the purchased item;
b. registering said user, if said user is not already registered to said system, to store personal and payment information;
c. confirming the transaction.

5. A system according to claim 4 wherein said processing a payment function further causes the computer stored instructions to perform the following subfunctions:
a. having a Gear Box software receiving a payment request from a requesting channel;
b. retrieving user's payment data from a central database, if said user is already registered to the system;
c. formatting a payment transaction;
e. forwarding a payment request data to a Kernel software;
f. returning payment results to said requesting channel;
g. sending real time financial transactions to a banking system for processing.

6. A system according to claim 5 wherein said subfunction of formatting a payment transaction further comprises the subfunctions of:
a. retrieving a payment request which comprises at least:
a merchant identification;
a user identification;
a debit or credit indicator;
a transaction amount;
b. using the merchant identification to retrieve the merchant's bank account number from a merchant server;
c. using the user identification to retrieve the user's credit card number or other payment instruments to be debited;
d. formatting a payment transaction which comprises at least:
a merchant's bank account number;
a user's credit card number or payment instrument;
debit or credit indicator;
a transaction amount;
e. forwarding said payment transaction to a Kernel software for further real time processing.

7. A system according to claim 1 wherein said users can obtain registration to the system using multiple channel devices, comprising a remote public terminal or an automated teller machine (ATM), by selecting a personal identification code or allowing the computer stored instructions to perform the following functions:
a. automatically generate a personal identifications code or acquire one through biometric scanning;
b. recording the user identification data into a central database to allow the system to recognize the same user during future transactions without disclosing said user's identification data to the merchant;
c. recording the user's method of payment to be available for future transactions, without disclosing this information to the merchant.

8. A system according to claim 1, wherein said function of activating the usage of a user's channel device using a remote public terminal comprises the subfunctions of:
a. a user selecting the subfunction itself from the display unit of said remote public terminal and providing the required identification and related Personal Identification Number (PIN) code;
b. a user providing a new alias identifier and the corresponding channel-device;
causing the computer stored instructions to perform the validation of entered information and allowing said user to perform the functions of:
a. selecting to maintain a same method of payment already associated to a master code or;
b. entering a new payment credit card number to be associated to the new alias identifier associated to a new channel device, after the system's validation of said new payment credit card number.

9. A system according to claim 1, wherein said function of changing a method of payment using a remote public terminal allows a user to select the function itself from the display unit of said remote public terminal and providing the required identification and related Personal Identification Number (PIN) code;
and causing the computer stored instructions to perform the following functions:
a. validating the supplied information, and, if correct, retrieving all alias identifiers for all channel devices already entered for said user and related method of payments;
b. asking the user whether globally replacing all methods of payment with a new method of payment or changing a specific method of payment;
and allowing the user to supply a new payment data whether globally replacing all method of payments or the user replacing a specific method of payment with another one.

10. A system according to claim 1, wherein said function of totally deactivating a user using said remote public terminal comprises the subfunctions of:

a. a user selecting the procedure itself from the display unit of said remote public selecting terminal and providing the required identification and related Personal Identification Number (PIN) code;

b. a user selecting total deactivation of the user and causing the computer stored instructions to retrieve a master's code to be deleted, while deleting all associated alias identifiers along with all method of payments and user's information.

11. A system according to claim 1, wherein said function of specifically deactivating a user's use of a specific channel device using a remote public terminal, allows a user to select the function itself from the display unit of said remote public terminal and providing the required identification and related Personal Identification Number (PIN) code; causing the computer stored instructions to validate the supplied information, and, if correct, retrieve all alias identifiers for all channel devices already entered for a user and related method of payments; allowing a user to select an alias identifier for deletion; causing the computer stored instructions to retrieve said alias identifier and related information to be deleted by the computer stored instructions from the central data base.

12. A system according to claim 1, wherein said function of activating or deactivating a channel device using said channel device is dependent on the associated channel handler which is either a touch tone telephone, or an interactive television set, or a mobile telephone using the Dual Tone Multi Frequency (DTMF) method, or a mobile telephone using the Short Message Service (SMS) method.

13. A system according to claim 12, wherein said function of activating or deactivating a channel device and the associated channel handler, using a touch tone telephone comprises the subfunctions of:

a. a user calling a dedicated telephone number connected to an Interactive Voice Responder (IVR), providing automated selection of the activation or deactivation process;

b. said user providing via the telephone keyboard of said touch tone telephone the required identification and related Personal Identification Number (PIN);

and causing the computer stored instructions to perform the following functions:

a. the system verifying whether a telephone line is in use for that user;

b. the system asking confirmation of the alias code for the activation of the touch tone telephone as a channel device, if the telephone is not yet in use for that user;

c. the system asking confirmation of the alias code for the deactivation of a touch tone telephone as a channel device, if the telephone is already in use for that user;

d. the system storing in the central data base the user's telephone number and the new alias code, linked to a master's code, if the number is not yet stored;

e. the system deleting from a central data base the user's telephone number if the number is already stored;

f. the system confirming the desired action to said user.

14. A system according to claim 12, wherein the function of activating or deactivating a channel device and an associated channel handler, using an interactive television set, causes the computer stored instructions to perform the following subfunctions:

a. inserting a user's master's identification code and a Personal Identification Number (PIN) to activate or deactivate the payment capability using a television return path of an interactive television set;

b. a merchant's server recognizing the user's intention to enable or disable his/her interactive television set, using the television's subscriber code as an alias code;

c. verifying the user's subscriber number of said interactive television set is not yet in use and adding said subscriber's number as the alias code to a central data base or;

d. verifying said user's subscriber number is already in use and deleting said subscriber's number as the alias code from a central data base.

15. A system according to claim 12, wherein the function of activating or deactivating a channel device and the associated channel handler, using a mobile telephone which uses the Dual Tone Multi Frequency (DTMF) method, allows the user to perform the following functions:

a. calling via a telephone a dedicated telephone number connected to an Interactive Voice Responder (IVR), providing automated selection of the activation or deactivation process;

b. providing via a telephone keyboard a required identification and a related Personal Identification Number (PIN) code;

causing the computer stored instructions to perform the following functions:

a. verifying whether the telephone line is in use for that user;

b. asking confirmation of the alias code which is the International Mobile Subscriber Identity (IMSI) of said mobile telephone for the activation of said mobile telephone as a channel device, if said mobile telephone International Mobile Subscriber Identity (IMSI) is not yet in use for that user;

c. asking confirmation of said alias code which is the International Mobile Subscriber Identity (IMSI) of the mobile telephone for the deactivation of said mobile telephone as a channel device, if said mobile telephone International Mobile Subscriber Identity (IMSI) is already in use for said user;

d. storing in a central data base said user's mobile telephone number and a new alias code, linked to a master's code, if said mobile telephone number is not yet stored;

e. deleting from a central data base said user's mobile telephone if the number is already stored;

f. confirming the desired action to said user.

16. A system according to claim 12, wherein the function of activating or deactivating a channel device and the associated channel handler, using a mobile telephone which uses the Short Message Service (SMS) method, allows said user to send a Short Message Service (SMS) message with the telephone identifier method of International Mobile Subscriber Identity (IMSI) or International Mobile Equipment Identity (IMEI), including the master's identification number and related Personal Identification Number (PIN) to a dedicated telephone number connected to a Short Message Service SMS gateway;

causing the computer stored instructions to perform the following functions:

a. verifying whether said International Mobile Subscriber Identity (IMSI) or International Mobile Equipment Identity (IMEI) number is already present or not for said user;

b. executing the deactivation if the International Mobile Subscriber Identity (IMSI) or International Mobile Equipment Identity (IMEI) number is already present for said user or;

c. executing the activation if the International Mobile Subscriber Identity (IMSI) or International Mobile Equipment Identity (IMEI) number is not yet present for said user, associating the International Mobile Subscriber Identity (IMS) number as an alias to the master's code of said user;

d. confirming the desired action to said user.

* * * * *